United States Patent [19]

Hall

[11] Patent Number: 5,758,921
[45] Date of Patent: Jun. 2, 1998

[54] RETRACTABLE PICKUP TRUCK COVER

[76] Inventor: Elizabeth R. Hall, 1746 Maryland St., Houston, Tex. 77006

[21] Appl. No.: 648,445

[22] Filed: May 15, 1996

[51] Int. Cl.⁶ ............................................. B60T 11/00
[52] U.S. Cl. ........................................ 296/98; 296/100
[58] Field of Search ............................ 296/98, 100, 37.6, 296/136

[56] References Cited

U.S. PATENT DOCUMENTS

| | | |
|---|---|---|
| 2,688,513 | 9/1954 | Poirier . |
| 2,773,547 | 12/1956 | Voss . |
| 2,811,321 | 10/1957 | La Barre . |
| 2,898,147 | 8/1959 | Homer . |
| 3,146,824 | 9/1964 | Veilleux . |
| 3,298,731 | 1/1967 | Sangimino . |
| 3,467,431 | 9/1969 | Turcotte . |
| 3,977,719 | 8/1976 | Thurston . |
| 4,531,774 | 7/1985 | Whatley ................... 296/37.6 |
| 4,563,034 | 1/1986 | Lamb . |
| 4,728,017 | 3/1988 | Mullican .................. 296/37.6 |
| 5,123,691 | 6/1992 | Ginn ........................ 296/37.6 |
| 5,244,246 | 9/1993 | Cunningham ............ 296/136 |
| 5,257,850 | 11/1993 | Brim ......................... 296/98 |
| 5,423,588 | 6/1995 | Eglinton ................... 296/98 |
| 5,584,521 | 12/1996 | Hathaway et al. ....... 296/37.6 |

*Primary Examiner*—Gary C. Hoge
*Attorney, Agent, or Firm*—Elizabeth R. Hall

[57] ABSTRACT

An apparatus for covering the open truck beds of pickup trucks and the like with a flexible cover is described. The apparatus is a truck bed protector that has a relatively water-impenetrable cover fixed to a spring-loaded, continuously biased, roller that is rotatably mounted in a housing. The housing is mounted to the pickup truck bed with locking brackets to ensure that the truck bed protector cannot be removed without a key. Extensions are also provided for the cover that can be easily attached to the cover to allow the cover to fit over objects of different shapes and sizes.

21 Claims, 6 Drawing Sheets

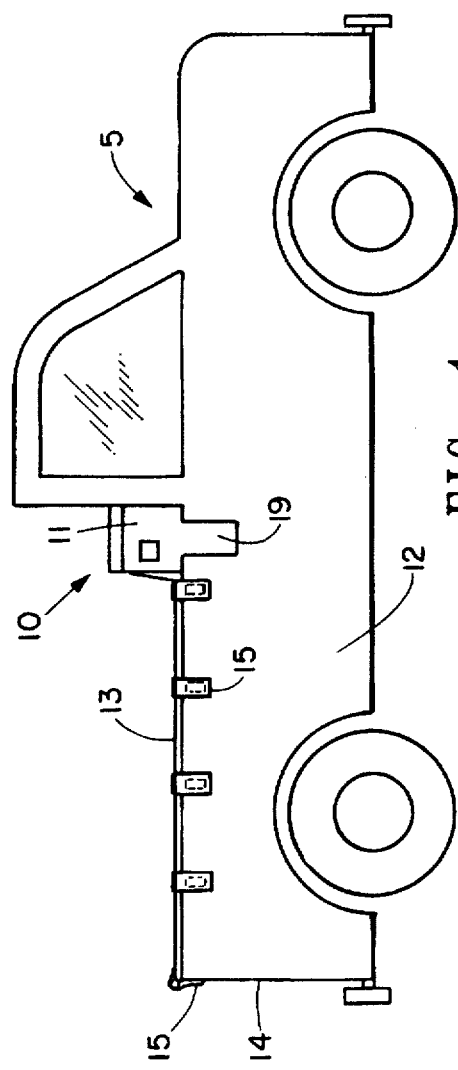
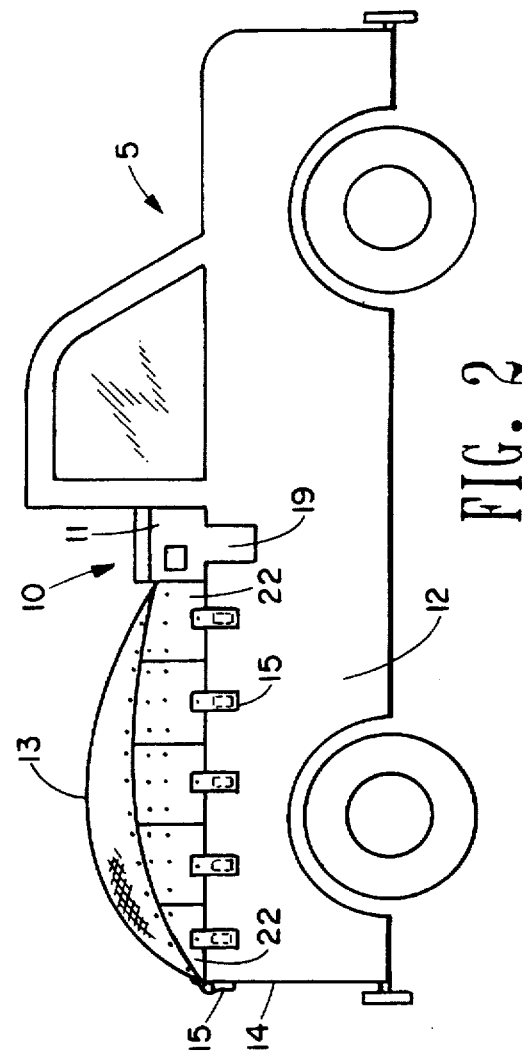

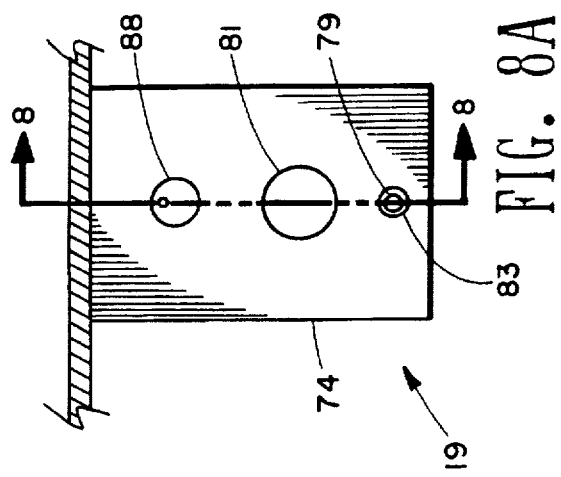
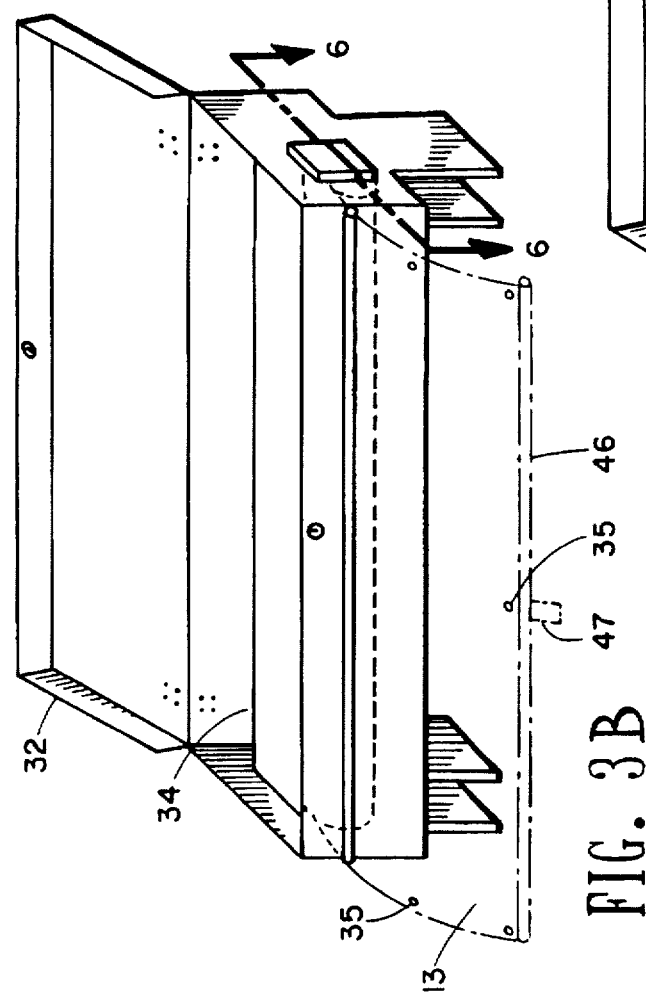
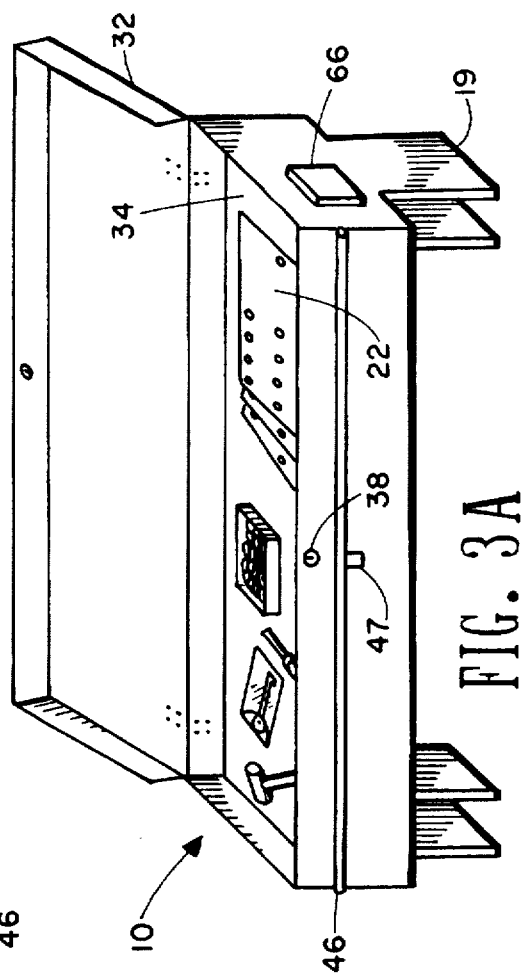

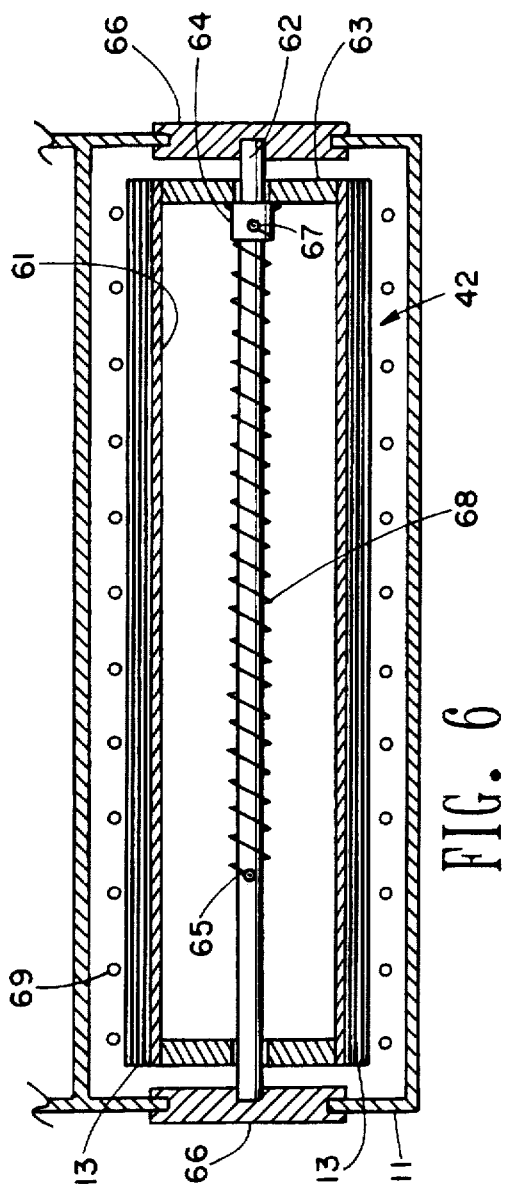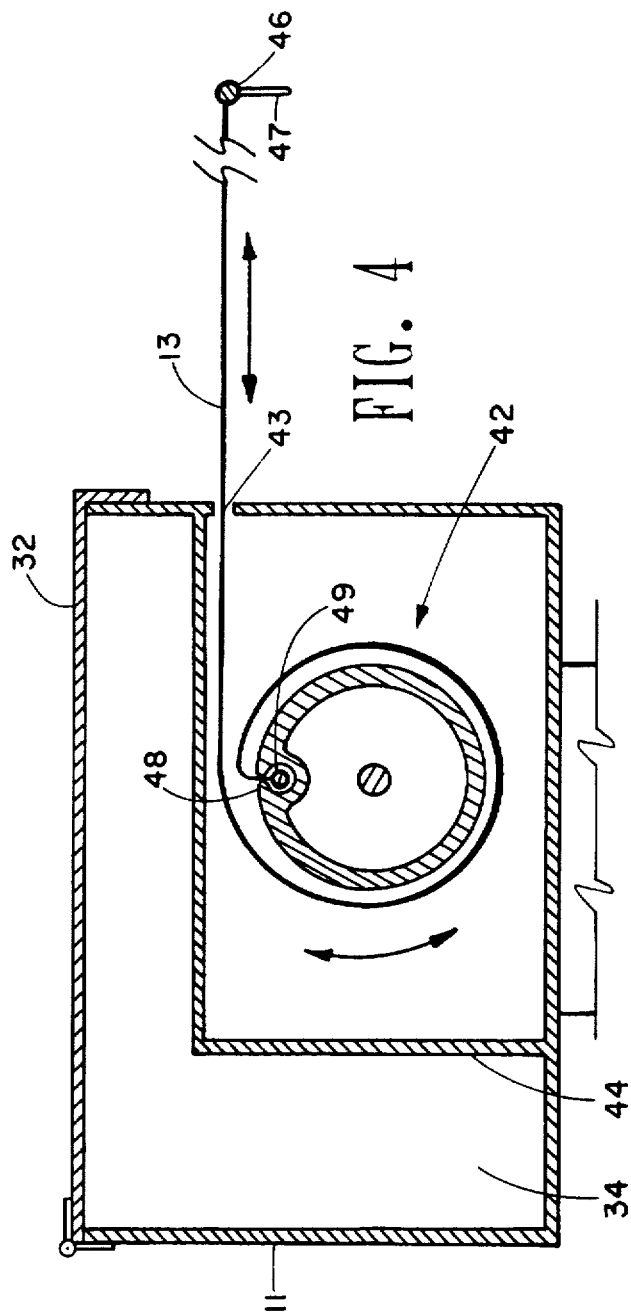

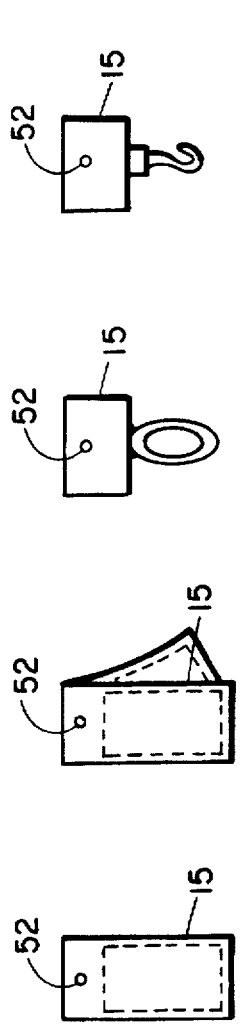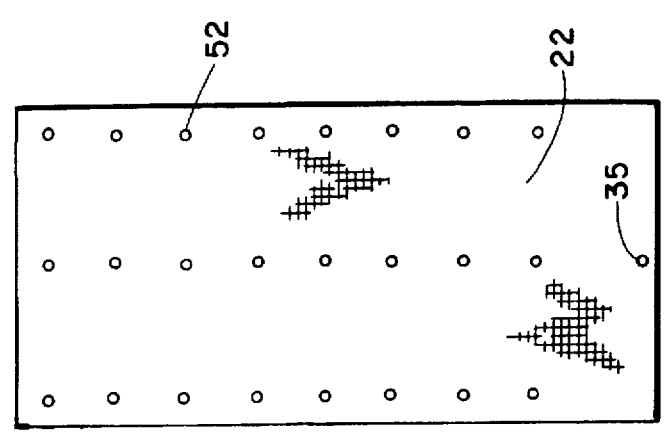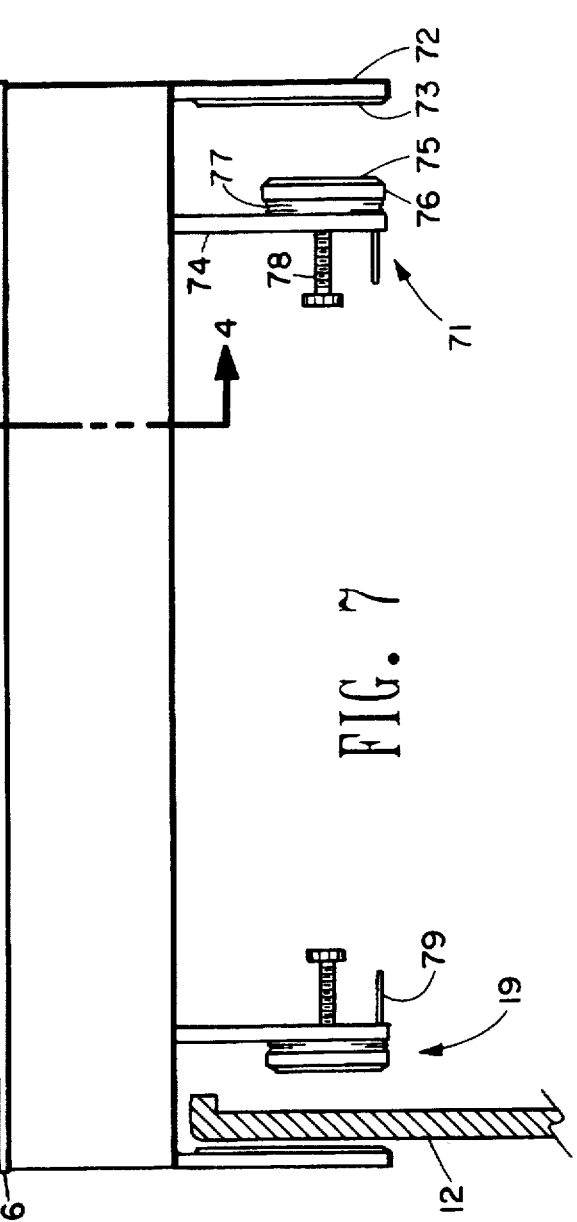

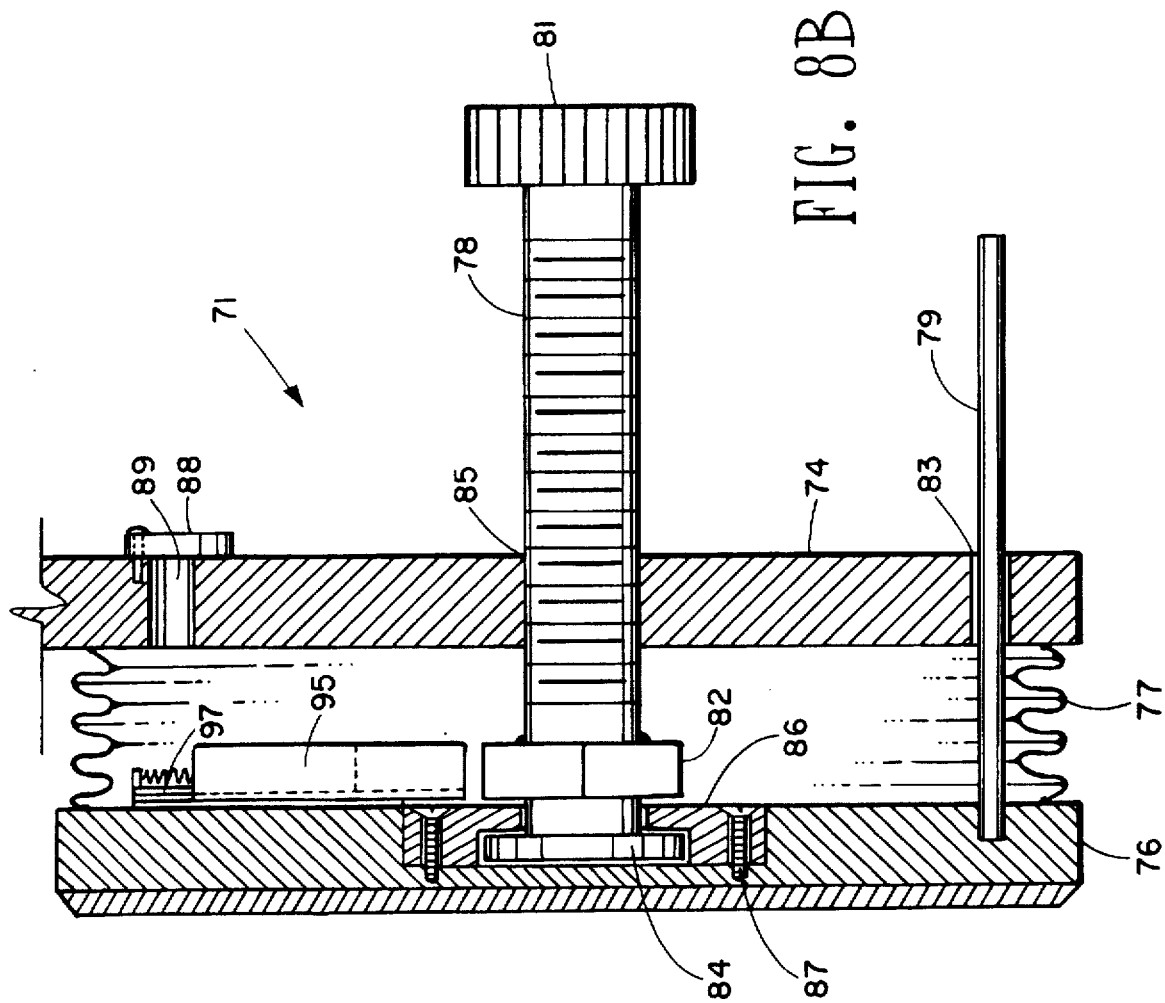

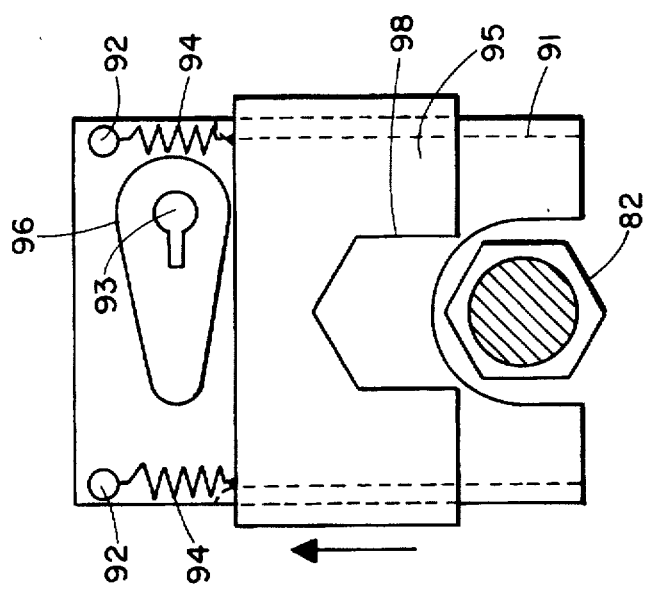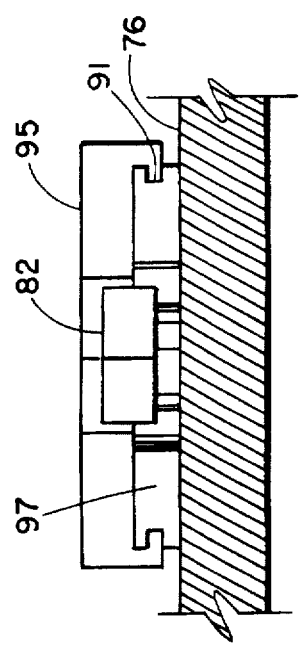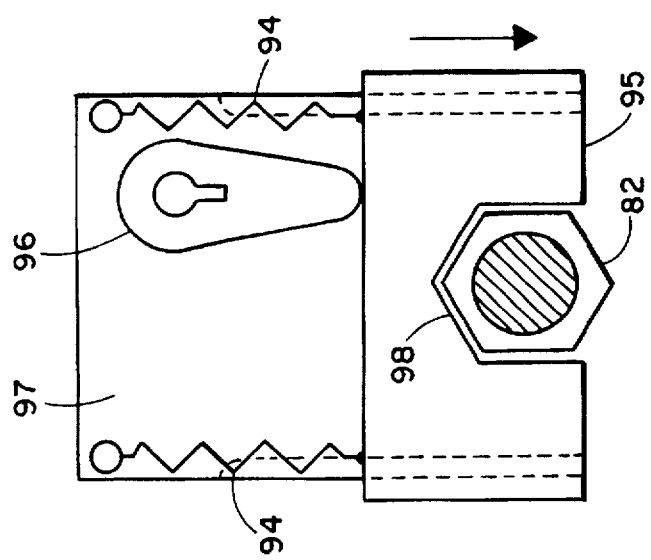

RETRACTABLE PICKUP TRUCK COVER

TECHNICAL FIELD OF THE INVENTION

The present invention relates to an apparatus for covering the open truck beds of pickup trucks and the like with a flexible cover. This invention is particularly related to a pickup truck bed protector that contains a spring-loaded cover that can be rolled, or unrolled, when needed to cover the top of a truck bed. The pickup truck bed protector is removably attached to a pickup truck bed without modification of the pickup truck and can be locked in place.

BACKGROUND OF THE INVENTION

Pickup trucks are typically used to carry all types of materials such as groceries, furniture, construction materials, or farm equipment. One of the major reasons that pickup trucks are used for carrying all kinds of materials is because pickup truck beds have an open top with low sides and a tailgate that allow one to easily load and unload objects of different sizes and shapes.

However, a major problem with carrying materials in an open pickup truck bed is that the materials are exposed to the weather and are susceptible to blowing out of the truck bed during transport. In order to prevent the loss of materials during transport and to protect the contents of the truck bed from inclement weather, the top of the truck bed is often covered with a hard shell cover or a weatherproof tarpaulin which extends over the top of the truck bed. However, hard shell covers restrict the height of the materials being carried and tarpaulins must be stored when not in use and are susceptible to being lost or misplaced. In addition, attaching the tarpaulin with ropes is time consuming and awkward.

Several approaches to solving the problems with tarpaulins have been disclosed. For example, U.S. Pat. No. 2,898, 147 to Homer; U.S. Pat. No. 3,146,824 to Veilleux; and U.S. Pat. No. 4,563,034 to Lamb all show a retractable cover designed for covering a conventional bed of a pickup truck. However, each of these covers are made to go straight across the top of the sides of the pickup truck bed and do not provide for covering large items that extend above the sides of the bed of the truck. In addition, each of these covers requires that some part of the apparatus be bolted or attached to the truck body in such a way as to require that one or more holes be drilled in the truck body making the truck body susceptible to rust and corrosion.

Accordingly, a need exists for a satisfactory means for covering materials that are being transported in a pickup truck bed with a cover that is normally stored out of the way, but that can be quickly and conveniently installed over materials of different shapes and sizes to protect those transported materials from inclement weather. Furthermore, a need exists for a means of covering materials that are in the bed of a pickup truck with a cover that is securely attached to the pickup truck without requiring the truck body itself be modified or pierced.

SUMMARY OF THE INVENTION

The present invention meets the needs discussed above by providing a retractable cover for a pickup truck bed that is adjustable to cover materials of a variety of shapes and sizes.

One embodiment of the present invention includes a tool box that is permanently attached to the pickup truck bed that contains a roller with a flexible, impervious cover wrapped around it that can be easily extended to cover the truck bed and can be retracted when not in use.

Another embodiment of the present invention includes a retractable cover for the bed of a pickup truck that does not require that the pickup truck be modified in any way in order to attach the retractable cover.

A further embodiment of the present invention includes a retractable cover that is expandable to cover large objects that protrude above the top of the truck bed.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the concept and the specific embodiments disclosed may be readily utilized as a basis for modifying or designing other processes or apparatuses for carrying out the same purpose as the present invention. It should also be realized by those skilled in the art that such equivalent constructions do not depart from the spirit and scope of the invention as set forth in the appended claims.

BRIEF DESCRIPTION OF THE DRAWINGS

Numerous objects, features and advantages of the present invention will be readily apparent to those of ordinary skill in the art upon reading the following disclosure in conjunction with the accompanying drawings, in which:

FIG. 1 is a side view of a pickup truck employing one embodiment of the present invention with the cover thereof extended to cover the pickup truck bed;

FIG. 2 is a side view of the embodiment shown in FIG. 1 with extensions attached to the pickup truck bed cover;

FIG. 3A is a perspective view of the pickup truck bed protector with the lid thereof in an open position;

FIG. 3B is a perspective view of the pickup truck bed protector showing the spring roller assembly and the cover in a semiextended position in dotted line;

FIG. 4 is a cross sectional view taken along line 4—4 of FIG. 7 of the housing;

FIG. 5A is a plan view of one embodiment of an extension flap;

FIGS. 5B–E are plan views of several embodiments of fasteners;

FIG. 6 is a cross sectional view taken along line 6—6 of FIG. 3B of the spring roller assembly and the attached cover;

FIG. 7 is a longitudinal frontal view of the pickup track bed protector and its mounting brackets;

FIG. 8A is a side view of the internal side of a mounting bracket;

FIG. 8B is a cross sectional view taken along line 8—8 of FIG. 8A;

FIG. 9A is a top view of a locking mechanism is an unlocked position;

FIG. 9B is a top view of the locking mechanism in a locked position; and

FIG. 9C is a frontal view of the locking mechanism.

DETAILED DESCRIPTION OF THE INVENTION

The present invention relates to an apparatus for covering the open truck beds of pickup trucks and the like with a flexible cover. FIG. 1 shows a truck bed protector 10 mounted to the forward section of the pickup truck bed. Truck bed protector 10 is mounted on side panels 12 of a pickup truck 5 by brackets 19 that are described below. Truck bed protector 10 includes a housing 11 which contains a cover 13 that is fixed to a spring loaded continuously biased, spring roller assembly rotatably mounted in housing 11.

Cover 13 can be withdrawn from housing 11 to cover the open bed of pickup truck 5 as illustrated in FIG. 1. Cover 13 is made of any suitable, flexible material such as canvas, neoprene and various synthetic plastic materials which provide a relatively water-impenetrable and long-lasting material. When cover 13 is extended over the truck bed, cover 13 is retained in place by a plurality of fasteners 15. Fasteners 15 can also be used to retain the distal edge of cover 13 on the top side of pickup truck tail gate 14.

FIG. 2 illustrates cover 13 extended over a truck bed that contains items which extend well above the top of truck side panels 12. In order to cover the materials in the truck bed and protect the materials from inclement weather, cover 13 can be extended along its sides using extension flaps 22.

FIG. 3A shows the truck bed protector 10 with lid 32 in an open position. Truck bed protector 10 has an optional storage area 34 under lid 32. When the truck bed protector 10 is in a closed position, lock 38 can be engaged to secure the materials stored in storage area 34. This storage area 34 can be used to store tools, fasteners 15, extension flaps 22, and a key that can be used to lock brackets 19 into place. Although FIG. 3A shows a preferred embodiment of storage area 34, numerous other configurations can be used. For example, truck bed protector 10 can be a typical truck bed tool box extending to the floor of the truck bed that has a small compartment 44 within the tool box that contains the cover 13 wrapped around a spring roller assembly 42 as shown in FIG. 4.

The cover 13 is attached to the spring roller assembly 42 so that as the spring roller assembly 42 is rotated, the cover 13 can be rolled and collected thereon as seen in FIG. 4. A preferred method of attaching cover 13 to spring roller assembly 42 is to place one end of cover 13, an end that has a hem sewn into it in which rod 49 may be inserted, into a concave depression or groove 48 in the outer wall of the spring roller assembly 42 that extends longitudinally along the entire length of the spring roller assembly 42. Similarly, a rod 46 can be sewn in the opposite end of cover 13 from the end attached to spring roller assembly 42. Rod 46 is effective in preventing the distal end of cover 13 from entering the housing 11 through slot 43. An optional flap 47 may be attached to the distal end of cover 13 to make it easier to grab and pull cover 13 out of the housing 11 to extend cover 13 over the truck bed.

FIG. 3B illustrates how cover 13 can be pulled out of the housing 11 towards the tail gate 14 of the pickup truck bed. Cover 13 has a plurality of attachment means placed along its exposed edges, such as cover snaps 35. Other known attachment means include zippers, pressure engaged ziplock seals, the well known hook and loop mechanism commercially known as VELCRO, etc.

Cover snaps 35 allow the user of cover 13 to quickly and easily attach either extension flaps 22 (shown in FIG. 5A) or fasteners 15 (such as shown in FIGS. 5B, 5C, 5D, and 5E) to the ends and sides of cover 13. A preferred embodiment of the invention utilizes extension flaps 22 having rows of extension snaps 52 that are spaced to align with and engage cover snaps 35 on the back and sides of cover 13. Since each extension flap 22 has rows of extension snaps 52 along its length, the user can adjust the length of the individual extension flap 22 that extends from cover 13 to connect to the pickup truck bed (see FIG. 2). This feature is particularly helpful when one is transporting large odd shaped items where the optimum length and width of cover 13 varies along the length and width of the pickup truck bed.

A variety of fasteners 15 having an attachment means, such as an extension snap 52 attached to one end of the fasteners, may be used to secure the back and sides of cover 13 to the pickup truck bed. For example, one may want to use fasteners that have magnets sewn within a fabric covering (see FIGS. 5B and 5C) for pickup trucks where the top rim of the truck bed is smooth. The fastener 15 illustrated in FIG. 5B has a single flap with a magnet sewn within it, while FIG. 5C shows a fastener 15 that has two magnetized flaps, one flap for each side of the pickup truck side panel 12. On the other hand, one may want to use fasteners that have a loop at one end (see FIG. 5D) if the pickup truck bed has hooks attached to it. Similarly, fasteners with hooks (see FIG. 5E) would be appropriate for pickup trucks that have a ridge along the top edge of the truck bed that would be easy to hook under. Of course, other types of fasteners 15 may also be used. An alternative embodiment of the truck bed protector 10 may include fasteners 15 that are permanently attached to cover 13 and will fold over the edges of cover 13 as cover 13 is rolled into housing 11 for storage.

FIG. 6 is a cross section of housing 11 and spring roller assembly 42. A number of openings 69 may be present in the bottom and sides of housing 11 to encourage drainage and air circulation. Openings 69 help minimize the growth of fungus such as mildew on the cover 13 while it is stored within housing 11.

Spring roller assembly 42 is rotatably mounted in housing 11 as seen in FIG. 6. A preferred embodiment of spring roller assembly 42 comprises a light weight metallic tube 61 closed at each of its ends with a form fitting cap 63 adapted to enter the open ends of the tube 61. A stationary axle 62 traverses the internal bore of spring roller assembly 42 and is mounted into end plates 66 that are inset in the sides of housing 11. Attached to cap 63 and encircling axle 62 is an end section 64 which rotates with the rotation of spring roller assembly 42. A loose fitting helical spring 68 circumscribes the axle 62 with one of its ends 65 being permanently affixed to axle 62 and the other end 67 fixed to end section 64.

As the cover 13 is unrolled or pulled toward the tail gate 14 of the truck bed, the helical spring 68 is tightened about the stationary axle 62 by rotation of the spring roller assembly 42 and end section 64. As the cover is extended toward its limit, the tension of the spring 68 is increased creating an increasing force urging the cover 13 back toward the spring roller assembly 42.

Truck bed protector 10 can easily be mounted to the truck bed without piercing the body of the truck using brackets 19. As shown in FIG. 7, bracket 19 has an external side 72 that is permanently affixed to one end of the bottom side of housing 11. External side 72 has a cushion 73 attached to its interior side that abuts the side 12 of the pickup truck. Cushion 73 is made of a flexible material that can give somewhat when bracket 19 is tightened against the side 12 of the pickup truck. Furthermore, cushion 73 is made of a smooth material that will not scratch the paint on the pickup truck.

The internal side 71 of bracket 19 is comprised of a fixed plate 74 and an adjustable plate 76. The adjustable plate 76 is covered with a flexible cushion 75 that is similar to cushion 73. Adjustable plate 76 is tightened against the side of the pickup truck by turning bolt 78. Bolt 78 is threaded and will adjust the distance between adjustable plate 76 and fixed plate 74. A collapsible cover 77 protects the interior of internal side 71 from rain and dust. One embodiment of collapsible cover 77 is an accordion type rubber or plastic protector. Alternatively, the collapsible cover 77 may be composed of a series of metal pieces that will fit within each other as the adjustable plate 76 is moved towards the fixed plate 74 and yet will spread out and fit together to protect the interior of internal side 71 when the adjustable plate 76 is moved away from the fixed plate 74.

FIG. 8A shows a side view of internal side 71. FIG. 8B shows a cross-section of one embodiment of internal side 71 taken along line 8—8 of FIG. 8A. Fixed plate 74 may contain three apertures. A threaded aperture 85 interacts with threaded bolt 78 as threaded bolt 78 passes through the fixed plate 74. Bolt 78 is threaded along its length where it passes through fixed plate 74 to adjust the distance between fixed plate 74 and adjustable plate 76.

Aperture 89 is used to insert a key into slot 93 to lock and unlock bracket 19 as described in more detail below. The entrance to aperture 89 is protected from dust and water by cover 88. Cover 88 may be rotated to uncover aperture 89 whenever a user of truck protector 10 desires to lock or unlock bracket 19. For security purposes cover 88 may also include a lock (not shown), such as a combination lock.

Aperture 83 allows a dowel 79 to penetrate the fixed plate 74. Dowel 79 is permanently attached to adjustable plate 76 and is used to help keep the plates aligned. The use of dowel 79 in the present invention is optional and can be replaced by a number of other mechanisms, or may be eliminated as unnecessary, depending on the specific configuration of interior side 71.

As seen in FIG. 8B, adjustable plate 76 has an inset 86 that is fitted around an end 84 of bolt 78. Inset 86 is attached to adjustable plate 76 by screws 87, or by any other means of attachment known in the art. Inset 86 secures adjustable plate 76 to bolt 78, while allowing bolt 78 to turn. As torque is applied to a head 81 at the proximal end of bolt 78, the bolt 78 will turn and move the adjustable plate 76.

Brackets 19 may be locked to secure the truck protector 10 to the body of the pickup truck. When brackets 19 are locked, the truck protector 10 cannot be removed from the truck. One embodiment of a locking mechanism for bracket 19 is shown in FIGS. 9A, 9B and 9C. At the distal end of bolt 78, proximal to where bolt 78 enters inset 86, bolt 78 has a section 82 that is shaped like a nut (see FIG. 8B). This section 82 can be engaged by sliding plate 95 so that bolt 78 cannot turn. Sliding plate 95 is shown in FIGS. 9A and 9B.

Sliding plate 95 is slidably attached to adjustable plate 76 by either a set of brackets, or by having its sides wrapped around the edges of sheet 97 that is permanently attached to adjustable plate 76. Sheet 97 has channels 91 which accept the folded edges of sliding plate 95 and allow the back and forth movement of sliding plate 95 (see FIGS. 9A, 9B, and 9C).

Sliding plate 95 is held in an open position by springs 94 attached to sliding plate 95 and post 92 (see FIG. 9A). To lock sliding plate 95 into place around section 82, a long key is inserted through aperture 89 and into a slot 93 in a rotatable bar 96. Bar 96 is rotated, pushing sliding plate 95 towards section 82. Sliding plate 95 has an area 98 that can be fitted around section 82 to prevent section 82 from turning. When rotatable bar 96 has been rotated approximately 90°, area 98 fully engages section 82 such that bolt 78 cannot turn and brackets 19 are locked into place.

To unlock brackets 19, one can place the key through aperture 89 into slot 93 and turn bar 96 back to its original position. When bar 96 is moved back to its original position sliding plate 95 is pulled away from section 82 by springs 94 thereby releasing section 82 and allowing bolt 78 to turn. The embodiment described herein is only one of many methods of locking the brackets 19 into place.

The operation of the truck protector 10 is extremely simple. When covering the truck bed, the cover 13 is drawn outwardly of the housing 11 to the desired length against the continuous biasing pressure of the spring roller assembly 42 and is secured to the truck sides 12 and tail gate 14 with fasteners 15 that have been attached to the side and rear edges of cover 13.

When uncovering the truck bed, the fasteners 15 are disengaged from the truck sides and tail gate and are removed from the cover 13 and the spring roller assembly 42 winds up the cover 13 within the housing 11 until rod 46 abuts slot 43 closing it off from rain and dust.

The truck protector is also easy to install by mounting the apparatus on the forward end of the truck bed and tightening bolt 78 until the mounting brackets 19 are tightly secured on each side of the pickup truck bed. If desired, once the mounting brackets 19 are securely placed the brackets can be locked with a key.

Thus, it can be seen that the truck protector 10 provides a quick and easy means for covering and uncovering a pickup truck bed. The simplicity of operation enables even an unpracticed individual to use the truck protector 10 at a moment's notice effecting a saving of time which is particularly important in the event of inclement weather. Furthermore the truck protector 10 may be quickly installed on a pickup truck by one person and is relatively inexpensive both in initial investment and maintenance. The truck protector 10 may be simply and relatively inexpensively manufactured using readily available materials.

While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention.

What is claimed is:

1. A truck bed protector for covering the top of a bed of a pickup truck, said protector comprising:

an elongated housing adapted to be mounted on a pickup truck bed and to extend across the width of the pickup truck bed, said housing having a front, rear, top, bottom and end walls, said rear wall facing a tail gate of said truck and having an elongated slot therein extending horizontally substantially across the length of said housing;

an elongated spring roller assembly rotatably mounted within said housing on the end walls thereof, said spring roller assembly adapted to provide a biasing action when rotated in one direction;

a generally rectangular cover of flexible material having front, rear and side edges, said cover being mounted at the front edge thereof on said spring roller assembly and rolled thereon in a stored position substantially within said housing, said cover mounted to said spring roller assembly such that said roller assembly is rotated in said one direction when said cover is unrolled through said slot to a covering position; and means for locking said protector to said truck body without piercing said truck body, said locking means attached to an exterior surface of said elongated housing.

2. The truck protector of claim 1, further comprising a rod enclosed within the rear edge of said cover, said rod being adapted to be drawn towards said housing by the biasing action of said rotated spring roller assembly to form a closure for said slot when said cover is in said stored position.

3. The truck protector of claim 1, wherein said housing contains openings that allow for water drainage and air circulation.

4. The truck protector of claim 1, wherein said housing includes a storage area.

5. The truck protector of claim 1, wherein said housing includes a lid.

6. The truck protector of claim 5, wherein said housing includes a means for locking said lid.

7. The truck protector of claim 1, wherein said cover includes means for removably attaching objects to said cover, said attaching means secured to the rear and side edges of said cover.

8. The truck protector of claim 7, further comprising a plurality of extension flaps adapted to be removably attached to said cover through interaction with said cover attaching means.

9. The truck protector of claim 8, wherein said extension flaps have means for removably attaching said extension flaps to said cover.

10. The truck protector of claim 7, further comprising a plurality of fasteners having a top and a bottom end, said top end adapted to be removably attached to said cover through interaction with said cover attaching means and said bottom end adapted to secure said cover to said pickup truck bed.

11. The truck protector of claim 8, further comprising a plurality of fasteners having a top and a bottom end, said top end adapted to be removably attached to said extension flap and said bottom end adapted to secure said cover to said pickup truck bed.

12. The truck protector of claim 11, wherein said extension flaps are adapted to interact with said fasteners.

13. The truck protector of claim 1, further comprising a plurality of fasteners adapted to be removably attached to said cover and designed to directly secure said cover to said truck bed.

14. The truck protector of claim 13, wherein said fasteners include a magnet.

15. A truck bed protector for covering the top of a bed of a pickup truck, said protector comprising:

an elongated housing adapted to be mounted on a pickup truck bed and to extend across the width of the pickup truck bed, said housing having a front, rear, top, bottom and end walls, said rear wall facing a tail gate of said truck and having an elongated slot therein extending horizontally substantially across the length of said housing;

an elongated spring roller assembly rotatably mounted within said housing on the end walls thereof, said spring roller assembly adapted to provide a biasing action when rotated in one direction;

a generally rectangular cover of flexible material having front, rear and side edges, said cover being mounted at the front edge thereof on said spring roller assembly and rolled thereon in a stored position substantially within said housing, said cover mounted to said spring roller assembly such that said roller assembly is rotated in said one direction when said cover is unrolled through said slot to a covering position;

means for removably mounting said protector to said truck body without piercing said truck body; and a plurality of fasteners adapted to secure said cover to said truck bed, wherein said fasteners include two points of interaction with a side wall of said truck bed, a first point of interaction with an outside surface of the side wall and a second point of interaction with an inside surface of the side wall.

16. The truck protector of claim 1, wherein said mounting means includes a means for locking said mounting means onto said truck body.

17. The truck protector of claim 1, wherein said mounting means is adapted to be secured to said truck bed by tightening an adjustable plate against a side wall of the truck bed.

18. The truck protector of claim 1, wherein said cover is made of a substantially water impenetrable material.

19. The truck protector of claim 1, wherein said cover is dimensioned to cover the top of the pickup truck bed when unrolled through said slot to said covering position.

20. A truck bed protector for covering the top of a bed of a pickup truck, said protector comprising:

an elongated housing adapted to be mounted on a pickup truck bed and to extend across the width of the pickup truck bed, said housing having a front, rear, top, bottom and end walls, said rear wall facing the tail gate and having an elongated slot therein extending horizontally substantially across the length of said housing;

an elongated spring roller assembly rotatably mounted within said housing on the end walls thereof, said spring roller assembly adapted to provide a biasing action when rotated in one direction;

a generally rectangular cover with flexible material having front, rear and side edges and means for removably attaching objects, said cover attaching means secured to the rear and side edges of said cover, said front edge of said cover being mounted on said spring roller assembly and rolled thereon in a stored position substantially within said housing, said cover mounted to said spring roller assembly such that said roller assembly is rotated in said one direction when said cover is unrolled through said aperture to a covering position;

a plurality of extension flaps having a plurality of rows of attaching means distributed along the length of the extension flap, each row of attaching means adapted to interact with said cover attaching means to allow adjustment of the length of each extension flap extending from the cover; and a plurality of fasteners adapted to be removably attached to said extension flaps on a first end through interaction with said flap attaching means and to said pickup truck bed on a second end.

21. A mounting bracket for securing an apparatus to a side wall of a truck bed without piercing said truck body, said mounting bracket comprising:

a fixed plate adapted for placement on a first surface of said side wall;

an adjustable plate adapted for placement on a second surface of said side wall, said adjustable plate having:
a first member that is fixed in a substantially parallel direction to said fixed plate, said first member having a one side and a second side;
a threaded bolt having a proximal end and a distal end, said proximal end located on said one side and said distal end passing substantially perpendicularly through said first member to said second side;

a second member that is attached to said distal end of said bolt, said second member adapted to move in the same direction as said bolt moves through said first member whenever torque is applied to said bolt; and means for locking said mounting bracket to said side wall of said truck bed, said locking means interacting with said bolt to prevent movement of said bolt when torque is applied to said bolt;

whereby said mounting bracket can be secured to said side wall by placing said fixed plate on said first surface of said side wall and by placing said adjustable plate on said second surface of said side wall and tightening said second member of said adjustable plate against said second surface of said side wall until said mounting bracket is held in place.

* * * * *